United States Patent Office 3,459,654
Patented Aug. 5, 1969

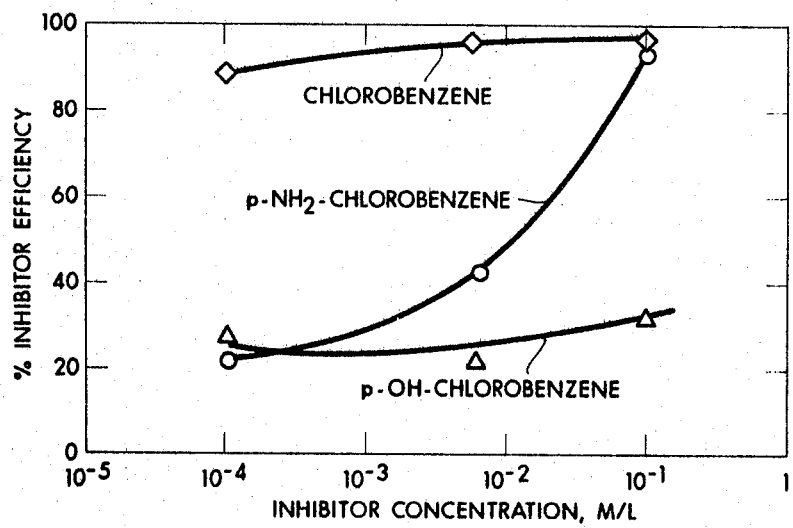

3,459,654
HALOGENATED AROMATIC INHIBITORS
Zisis Andrew Foroulis, Morristown, N.J., assignor to Esso Research and Engineering Company, a corporation of Delaware
Filed Oct. 16, 1967, Ser. No. 675,401
Int. Cl. C10g 9/10
U.S. Cl. 208—47                                            12 Claims

ABSTRACT OF THE DISCLOSURE

This disclosure relates to the inhibition of corrosion in chemical and petroleum process equipment exposed to acidic environments. In particular, the present disclosure relates to a method of inhibiting acid-induced corrosion in metal vessels exposed to acid environments by adding to the process streams a very small amount of a halogenated aromatic compound. It is believed that the halogenated aromatic forms a thin film over the metal surface and interferes with the diffusion of acid to the metal.

BACKGROUND OF THE INVENTION

It is well known that various inorganic as well as organic materials cause extensive damages to many metallic surfaces with which they come in contact. Examples of especially destructive inorganic compounds include hydrochloric acid, sulfuric acid, and hydrogen sulfide. With respect to organic compounds, acetic acid, phenolic solutions and naphthenic acids are extremely troublesome. The various aliphatic or naphthenic organic chlorides also tend to be quite corrosive; they usually do not occur naturally in crude oil but are sometimes added by producers for removal of paraffin deposits in producing wells and pipelines. Generally, corrosive materials fall within the definition of a Brönsted acid. By definition, a Brönsted acid is any substance that will donate one or more protons.

In particular, the petroleum industry has suffered greatly in loss of equipment and time because of the presence of various corrosion-causing compounds. Most crude petroleums contain numerous naturally occurring constituents and impurities which will cause severe corrosion of the metals from which conventional petroleum refining equipment is constructed. Such materials of construction are selected predominantly from carbon steels. While it would be possible to fabricate refinery equipment from steels which are less prone to corrosive attack, the cost of such equipment would be inordinately high and would make any process being conducted with such equipment extremely uneconomical.

In the past, it has been known to use various inhibitors in order to prevent, or at least retard, the oxygen induced corrosion. For instance, benzaldehyde in the presence of oxygen, is oxidized to benzoic acid. Consequently, to rid a system of oxygen, which is a particularly corrosive material, one would add benzaldehyde thereby removing the oxygen by utilizing it to oxidize benzaldehyde to benzoic acid. The benzoic acid, which is highly insoluble, would be precipitated out of solution.

A similar technique could be utilized to remove Brönsted acids from petroleum process streams. For example, molar quantities of Brönsted bases could be added to neutralize the acid components. However such a solution would not be a very practical one since there is a tremendous daily throughput of feedstreams through petroleum or chemical processes which contain acidic materials thereby requiring a correspondingly large amount of neutralizing bases. A further problem arises from the fact that the most likely bases for use in such neutralization reaction would be either organic nitrogen compounds or ammonia. Nitrogen, however, is a severe poison for many petroleum conversion catalysts such as reforming catalysts. Its use would therefore be contraindicated in any feedstream which would eventually contact such conversion catalysts. It is thus evident that a meaningful answer to the problem facing the petroleum industry would not be based on neutralization or removal of the acidic corrosive agents in the feedstream since such techniques would either be prohibitively expensive or would result in deactivation of conversion catalysts.

It has now been unexpectedly discovered that the addition of halogenated aromatic compounds to hydrocarbonaceous process streams serves to prevent the corrosive effects of acidic agents in such streams on metallic surfaces. The effects of even highly corrosive agents such as hydrogen sulfide, hydrogen chloride, the hydrolysis products of other chlorides, both organic and inorganic, and sulfuric acid will be successfully inhibited. Generally, the acids which may be inhibited by the instant invention, include the organic acids such as acetic acid, naphthenic acid, fumaric acid, critic acid, and succinic acid. Solutions containing organic (e.g. aliphatic or naphthenic) acid halides, formamide, dimethyl-sulfoxide and similar corrosive materials (which may be present either per se or by decomposition or hydrolysis) may be successfully treated. The corrosive effect of various corrosive inorganic acids on metal surfaces may be inhibited by the use of the present inventive process. Examples of inorganic acids contained in process streams upon which the practice of the present invention is useful include hydrochloric acid, sulfuric acid, dilute nitric acid, sulfurous acid, dilute perchloric acid, polyphosphoric acid, etc.

The metals which may be protected from corrosion by the process of the instant invention include carbon steel, nickel steel, copper and its alloys, stainless steels, etc. However, it should be emphasized that this invention will be most useful in preventing the corrosion of carbon steel, particularly as used in petroleum refinery facilities.

The present invention may be practiced effectively in systems having an inert atmosphere, i.e. in an atmosphere in which oxygen is present only in trace amounts, if at all. However, it should be pointed out that the present invention may be also practiced effectively in acidic corrosive environments in the presence of dissolved oxygen, provided that the pH of the solution is lower than 5 where corrosion is controlled by the concentration of the acidic components and temperature. In particular, such atmosphere may comprise nitrogen, hydrogen, carbon monoxide, carbon dioxide or mixtures of these various reducing or inert gases. The atmosphere may also contain small amounts of sulfur dioxide or sulfur trioxide. Such atmospheres are found frequently during the regeneration of catalysts for hydroforming, hydrotreating or other catalytic hydrogenation processes. It is an important aspect of this invention that in all instances no significant adverse effect upon catalyst activity results from contact of the catalyst with halogenated aromatic inhibitors. This is particularly important in the case of hydroforming or hydrotreating where the catalysts are expensive and it is extremely crucial, from a process economy point of view, to extend their life for as long as possible.

Hydroforming is now a process which is well known in the art and has been used in commercial scale in many plants in this country. Basically, the operation involves the contacting of a naphtha, either virgin, cracked, Fischer-Tropsch or any mixture thereof, with a solid catalytic material, which usually comprises platinum or palladium dispersed upon alumina. The process is conducted at elevated temperatures and pressures in the presence of added hydrogen.

The reactions involved in hydroforming are: (1) dehydrogenation of naphthenes to the corresponding aromatic hydrocarbons as were methylcyclohexane is dehydrogenated to form toluene; (2) isomerization of paraffins to form branched-chain paraffins or isomerization of ring compounds, such as ethylcyclopentane to form methylcyclohexane, which latter compound is then dehydrogenated to form toluene; (3) dehydrocyclization of paraffins to aromatics such as n-heptane to form toluene; and (4) hydrocracking of the higher boiling constituents of the feed to form lower boiling constituents.

As indicated above, catalysts that may be used for hydroforming a feedstock are those containing 0.01 to 1.0 wt. percent platinum or 0.1 to 2.0 wt. percent palladium dispersed upon a highly pure alumina support such as is obtained from aluminum alcoholate, as per U.S. Patent No. 2,636,865, or from an alumina hydrosol prepared by hydrolyzing aluminum metal with dilute acetic acid in the presence of very small, catalytic amounts of mercury. A suitable catalyst comprises about 0.2 to 0.8 wt. percent platinum widely dispersed upon alumina in the eta or gamma phase derived from a suitable aluminum alcoholate and between about 0.3 and 1.2 wt. percent chloride and having a surface area of about 50 to 300 square meters per gram. However, a variety of other catalysts may be utilized such as for example platinum on desurfaced silica-alumina.

Regeneration occurs at least once a month for each hydroforming reactor depending upon the feed quality and feed severity. However, in many cases more frequent regeneration is required. During regeneration coke is burned from the catalyst producing an environment which has a fair concentration of $CO_2$ and small quantities of $SO_2$ and $SO_3$. During this step, the chlorides to be found in the gas phase will increase due to an increase in water content of the gas which serves to strip the chloride off the catalyst. The second step is to remove any water left on the catalyst. This requires thorough drying of the flue gas, which is a mixture of nitrogen, $CO_2$, CO, $SO_2$, $SO_3$ and HCl. After most of the water has been removed, chlorination is started in a manner such that chlorine will be progressively absorbed by the catalyst. During the subsequent rejuvenation of the catalyst to rearrange the crystal structure, some chlorine will still be carried over with the flue gas. The last step in the regeneration operation is purging the system with nitrogen, an inert gas, to remove air and finally pressure up with hydrogen.

It is after purging that the inhibitor of the instant invention is injected in the system to prevent its possible oxidation by air at the high temperatures. The presence of the inhibitor serves to reduce or minimize corrosion in heat exchanging equipment and transfer lines where water condensate, containing the acidic components mentioned previously, accumulates. The inhibitor compound adsorbs on the metal surface presumably in the form of a thin film and thus minimizes corrosion by markedly lowering the rate of the corrosion reactions. As indicated earlier, the presence of a halogenated aromatic compound serves to inhibit the corrosive effects of various acid-based corrosion causing materials on metals. Here, as in the case of hydroforming, an inert gas, e.g. nitrogen, is present and in addition, corrosives such as hydrogen sulfide, hydrochloric acid and sulfuric acid are present. The addition of a halogenated aromatic-based inhibitor serves to minimize corrosion with no adverse effect on the platinum or palladium catalyst.

Another area where corrosion in an inert gas atmosphere is very widespread and has a most deleterious effect is in hydrotreating. Briefly, hydrotreating involves three main sets of reactions. Initially, there is sulfur reduction; i.e., sulfur in the form of mercaptan, disulfide or thiophene is reduced. In addition, oxygen is removed from various compounds such as phenol and peroxide. Finally, olefins in the treated stream are saturated and form the corresponding paraffinic compounds. All of these reactions require the presence and chemical consumption of hydrogen. These reactions may taken place in the presence of a variety of catalysts; perhaps the most widely used is cobalt molybdate.

A great problem in hydrotreating is the presence in the feedstreams of organic chlorides such as carbon tetrachloride and trichloroethylene. In addition, hydrogen chloride is often found in the hydrotreaters; the original source of this hydrogen chloride may be organic chloride or it may arise from hydroformer treat gas such as, for example by the decomposition of the chlorine-treated catalyst base. In any event, the hydrotreater effluent condenser and other overhead equipment has been plagued with problems instigated by the presence of hydrogen chloride.

In addition, as would be expected, a great deal of hyunexpectedly found that the addition of halogenated drogen sulfide is produced when sulfur is reduced in the hyrotreater. This causes severe corrosion particularly in the presence of water condensate. The effluent stream in the hydrotreater is in addition to naphtha predominantly hydrogen gas which is inert for the purposes of the present invention. The remainder of the gas is made up of water vapor, hydrogen chloride and hydrogen sulfide.

In accordance with the present invention, it has been unexpectedly found that the addition of halogenated aromatics to this effluent stream serves to inhibit metal corrosion. Additionally, the addition of halogenated aromatic-based additives does not have any detrimental effect on the hydrotreating catalysts.

The preferred corrosion inhibitors of the present invention are the halogenated benzenes. These substances have a general formula which corresponds to the following:

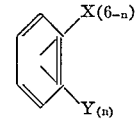

where X may be chlorine, bromine and iodine; Y may be hydrogen, lower alkyl, hydroxy, lower alkoxy, carboxy, and carboxy lower alkyl esters and $n$ may be an integer from 0 to 5.

It is generally preferred that X be chlorine and Y be hydrogen. The basis for this preference is ease of obtaining such materials in sufficient quantity at reasonable cost and for their efficacy in corrosion inhibition.

Another factor to be considered in this respect is the solubility of the halogenated benzene compounds in aqueous corrosive solutions. These compounds inhibit corrosion by adsorbing on the metal surface presumably in the form of a thin film and minimize corrosion by markedly slowing down the rate of the corrosion reactions. Since solution of an inhibitor in the corrosive medium is a prerequisite for its adsorption at the metal-solution interphase, it is natural to be expected that an inhibitor should be soluble, to a certain extent, in the corrosive fluid which usually is an aqueous solution of an electrolyte. However, it should be pointed out that excessive solubility of an organic compound could be detrimental to its inhibitor effectiveness. This is due to the adverse effect that the ultra-active intermolecular forces, between the inhibitor and the aqueous phase exert on the stability of the adsorbed inhibitor film.

It is apparent then that an optimum solubility of an organic compound in the corrosive fluid is required for effective inhibition. When the solubility is too low, the inhibition efficiency is low because of the limited amount of inhibitor reaching the metal-solution interphase. On the other hand, when the solubility is too high the inhibitor may be "washed away" from the interphase by the corrosive fluid.

The solubility limits to achieve optimum inhibitor effectiveness depend in general on the nature of the inhibitor molecule. For halogenated benzene compounds the optimum solubility is rather low due to the extreme effectiveness of these compounds to adsorb on the metal surface and inhibit corrosion. For example, monohalogenated benzene (chlorobenzene) exhibits an optimum solubility which results in a high level of inhibitor efficiency even at low concentration levels (Table I). Increasing the number of halogen atoms on the benzene ring increases the ability of the molecule to attach itself on the metal surface presumably through "chemisorption" by means of the halogen atoms. However, at the same time an increase in the number of the halogen atoms on the benzene ring decreases its solubility in the corrosive solution. The net result is a decrease in inhibitor effectiveness by increasing the number of halogen atoms. This can be seen by the decreasing inhibitor efficiency in going from chlorobenzene to dichlorobenzene to hexachlorobenzene (Tables I, II, III). This is also the order to decreasing solubility of these compounds in the aqueous corrosive solutions.

Likewise increasing the number of fused benzene rings in molecule of an halogenated aromatic compound, e.g., chloronaphthalene decreases its solubility with resulting lower inhibitor efficiency.

Introduction of hydrophilic substituent groups, e.g. —$NH_2$, —OH, —$SO_3Na$, etc. in the benzene ring of a given halogenated compound results, in general, in increasing solubility of the given molecule in the aqueous corrosive phase. In the Example 6 described later in detail, it can be seen that the introduction of hydrophilic substituent groups e.g. —OH and —$NH_2$ in chlorobenzene decreases its inhibitor effectiveness by increasing its solubility in the aqueous corrosive solution that results in "washing away" the inhibitor molecule from the metal surface.

By appropriate balance of the number of fused benzene rings in the molecule, the number of attached halogen atoms and the number and nature of attached substituent hydrophilic groups the solubility of the compound and its inhibitor efficiency can be easily optimized. However, on the basic of cost and availability the simple halogenated benzene compounds are generally preferred.

The concentration of inhibitor may vary widely depending upon the particular corrosive solution and the pH of the solution. For a corrosive solution of pH of 0 to 1, it is desirable that from $10^{-6}$ to $5 \times 10^{-1}$ moles of inhibitor per liter of corrosive solution preferably $10^{-4}$ to $2 \times 10^{-1}$ moles of inhibitor should be added per liter of corrosive solution. When the corrosive solution has a pH of 1 to 5, about $10^{-5}$ to $2 \times 10^{-1}$ moles of corrosion inhibitor should be added per liter of solution, most preferably $10^{-4}$ to $1 \times 10^{-1}$ moles per liter. The halogenated aromatic may be added directly into the vapor or liquid stream. In the case of the hydroforming or hydrotreating processes, the inhibitor should be injected directly into the vapor stream at the outlet of the hydroforming or hydrotreating reactor.

While the mechanism for the inhibiting action of halogenated aromatics is not completely understood, the following explanation is offered for the purpose of example and as an aid to understanding the invention and should not be taken as limiting the scope of the invention in any manner. The corrosion additives, e.g. halogenated aromatics, as indicated previously are believed to be adsorbed on the metal surface in the form of either a continuous or nearly continuous thin film. This film would serve to inhibit any chemical or electrochemical interaction between the acidic corrosive material in solution and the metal surface. It should be noted that only very small quantities of the inhibitor are utilized to form this thin film and the inhibitor is not believed to undergo any significant chemical reaction with the acidic corrosive material. Thus, if at all, only small amounts of additional inhibitor would be necessary to maintain long-term protection on metal surfaces, these additions being possibly necessitated by attrition losses due to physical interactions of the flowing stream with the film.

The additive of the instant invention exhibits utility under extremely broad temperature ranges. Halogenated aromatics collectively inhibit acid induced corrosion at temperatures in the range from about 0 to 600° F., preferably from 50 to 450° F. Under most preferred conditions, the additive would be utilized at a temperature range from 80 to 212° F. The pressure range in which the present invention may be practiced is also quite broad and pressures in the range of from about 15 to 400 p.s.i.g. may be utilized. It is understood that pressure is not critical since the invention may be utilized with the additive in both the liquid and the vapor phase.

The additive may be utilized in the following concentrations (in moles) per liter of corrosive fluid:

|  | M/l. |
|---|---|
| Broad range | $10^{-6}$ to $5 \times 10^{-1}$ |
| Preferred range | $10^{-5}$ to $2 \times 10^{-1}$ |
| Most preferred range | $10^{-4}$ to $10^{-1}$ |

The present invention will be more fully understood by referring to the following examples.

Example 1

This example illustrates the ability of chlorobenzene as an inhibitor of acid induced corrosion in 1020 carbon steel exposed to 0.1 normal hydrochloric acid at 77° F.

Corrosion rates were measured by weight loss of carbon steel (1020) specimens of approximately 10 square centimeter area. The specimens were abraded through 4–0 emery paper degreased in benzene, and washed in distilled water. Immediately after drying, the specimens were weighed and placed in an appropriate corrosion cell and immersed in the corrosive solution. The amount of corroded metal was determined by weight loss. The test time was from 2 days up to about seven days. The corrosion cell was basically a 2000 ml. Erlenmeyer flask with a special top to permit entrance and exit of nitrogen for deaeration and to prevent air contamination. A removable chimney was introduced in the corrosion cell from which the metal samples are suspended using suitable Pyrex hooks. The corrosive solution was deaerated with nitrogen before a run. Nitrogen was also bubbled through the solution continuously during a run to prevent contamination with air. Constant temperature was achieved by the use of a constant temperature oil bath or by using individual heating units with temperature controls. The results of representative experiments utilizing various concentrations of chlorobenzene in the above test procedure are summarized in Table I below.

TABLE I

[Protective properties of chlorobenzene to control corrosion of 1020 carbon steel in 0.1 N HCl (pH=1.0), 77° F. Solutions were deaerated with bubbling nitrogen in the test solutions]

| Inhibitor concentration, moles of inhibitor/liter of solution | Corrosion rate (mdd.), mgs./dec.²/day | Percent inhibitor efficiency [1] |
|---|---|---|
| Blank | 1,555 | |
| $10^{-4}$ M/l. chlorobenzene | 178 | 88.6 |
| $5 \times 10^{-3}$ M/l. chlorobenzene | 166 | 89.3 |
| $10^{-1}$ M/l. chlorobenzene | 164 | 89.4 |

[1] The effectiveness of an inhibitor to reduce corrosion is expressed as percent inhibitor efficiency $\left( = \frac{Io - Ii}{Io} \times 100 \right)$ where Io is the corrosion rate without and Ii is the corrosion rate with inhibitor.

The data demonstrates that relatively small amounts of chlorobenzene serve to inhibit to a large degree the rust rate due to the effect of acid on carbon steel.

Example 2

This example demonstrates the effectiveness of para dichlorobenzene as a corrosion inhibitor in the same test utilized in Example I above. The results of representative experiments are summarized below in Table II. Such results indicate the effectiveness of dichlorobenzene as an inhibitor of acid induced corrosion in carbon steel at low inhibitor concentrations.

TABLE II

[Protective properties of p-dichlorobenzene to control corrosion of 1020 carbon steel in 0.1 N HCl (pH=1.0) 77° F. Solutions were deaerated by bubbling nitrogen in the test solutions]

| Inhibitor concentration, moles of inhibitor/liter of solution | Corrosion rate (mdd.), mgs./dec.²/day | Percent inhibitor efficiency [1] |
|---|---|---|
| Blank | 1,555 | |
| $10^{-4}$ M/l. dichlorobenzene | 281 | 81.9 |
| $10^{-1}$ M/l. dichlorobenzene | 232 | 85.1 |

[1] See footnote on table I.

Example 3

This example illustrates the effectiveness of hexachlorobenzene as an inhibitor of acid induced corrosion in carbon steel utilizing the same test procedure as in Example 1. The results are summarized below in Table III. A high level of inhibitor efficiency was obtained at low concentration levels, of inhibitor.

TABLE III

[Protective properties of hexachlorobenzene to control corrosion of 1020 carbon steel in 0.1 N HCl (pH=1.0) 77° F. Solutions were deaerated by bubbling nitrogen in the test solutions]

| Inhibitor concentration, moles of inhibitor/liter of solution | Corrosion rate (mdd.), mgs./dec.²/day | Percent inhibitor efficiency |
|---|---|---|
| Blank | 1,555 | |
| $10^{-4}$ M/l. hexachlorobenzene | 268 | 81.6 |
| $5 \times 10^{-3}$ M/l. hexachlorobenzene | 237 | 84.8 |
| $10^{-1}$ M/l. hexachlorobenzene | 222 | 85.7 |

Example 4

This example demonstrates the corrosion inhibition properties of halogenated aromatic compounds in low concentrations when employed in a test utilizing acidic powerformer regeneration circuit condensate solutions. The pH of this solution was extremely acidic, e.g. 0.5, and the test procedure was, with the exception of the identity of the solution, the same as utilized in Example 1. The results obtained are summarized in Table IV. The outstanding ability of the halogenated aromatics to inhibit this type of corrosive element is clearly evidenced by the extremely high precent inhibitor efficiency obtained with all the samples of the present invention.

TABLE IV

[Protective properties of chlorinated aromatic compounds to control corrosion of 1020 carbon steel in hydroformer regeneration circuit condensate (pH=0.5), at 212° F.]

| Inhibitor concentration, moles of inhibitor/liter of solution | Steady-state corrosion rate (mdd.), mgs./dec.²/day | Percent inhibitor efficiency |
|---|---|---|
| Blank | 41,114 | |
| $10^{-1}$ M/l. hexachlorobenzene | 9.4 | 99.9 |
| $10^{-1}$ M/l. p-dichlorobenzene | 10.2 | 99.8 |
| $10^{-1}$ M/l. chlorobenzene | 44.7 | 99.6 |

Example 5

This example illustrates the effectiveness of iodobenzene as an inhibitor of acid induced corrosion of carbon steel utilizing the same test procedure as in Example 1. The results are below in Table V. A high level of inhibitor efficiency was obtained at all concentration levels tested.

TABLE V

[Protective properties of iodobenzene to control corrosion of 1020 carbon steel in 0.1 N HCl (pH=1.0), 77° F. Solutions were deaerated with bubbling nitrogen in the test solutions]

| Inhibitor concentration, moles of inhibitor/liter of solution | Corrosion rate (mdd.), mgs./dec.²/day | Percent inhibitor efficiency |
|---|---|---|
| Blank | 1,555 | |
| $10^{-4}$ M/l. iodobenzene | 183 | 88.2 |
| $5 \times 10^{-3}$ M/l. iodobenzene | 60.8 | 96 |
| $10^{-1}$ M/l. iodobenzene | 56.4 | 96.4 |

Example 6

This example illustrates the influence of substituent groups such as —OH, —NH₂ on the effectiveness of chlorobenzene to inhibit the corrosion of carbon steel in 0.1 N HCl at 77° F. The results of representative experiments are summarized in FIGURE 1. Such results indicate that substituent groups introduced in the benzene ring that increase the solubility of the inhibitor molecule in the aqueous acidic phase decrease its effectiveness particularly at the smaller concentrations. The solubility in the corrosive solution of the three compounds shown in FIGURE 1 increases in the order chlorobenzene<p-NH₂ chlorobenzene<p-OH-chlorobenzene. FIGURE 1 shows also that this is the order of decreasing inhibitor effectiveness particularly at lower concentrations.

What is claimed is:

1. A method for inhibiting corrosion in metal vessels contacting a process stream containing an acidic agent which is corrosive to said metal vessel, said method comprising adding a corrosion-inhibiting amount of a chlorinated aromatic compound to said process stream.

2. The method of claim 1 wherein said halogenated aromatic is added in a concentration within the range of from about $10^{-6}$ to $5 \times 10^{-1}$ moles per liter of process stream.

3. The method of claim 1 wherein said chlorinated aromatic compound is a chlorinated benzene having the formula:

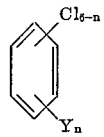

wherein Y is hydrogen lower alkyl hydroxy, lower alkoxy, carboxy or carboxy lower alkyl ester and $n$ is an integer from 0 to 5.

4. The method of claim 3 wherein said chlorinated benzene comprises chlorobenzene.

5. The method of claim 3 wherein said chlorinated benzene comprises paradichlorobenzene.

6. The method of claim 3 wherein said chlorinated benzene comprises hexachlorobenzene.

7. The method of claim 1 wherein said acidic corrosive agent comprises an aqueous solution of a mineral acid.

8. The method of claim 1 wherein said process stream is from a hydroforming or hydrotreating reaction wherein said chlorinated aromatic compound will not adversely affect the activity of the catalyst systems utilized in said hydroforming or hydrotreating reactions.

9. The method of claim 1 wherein the pH of said process stream containing the acid corrosive agent is in the range of 0 to 1 and the concentration of chlorinated aromatic inhibitor utilized is in the range of from $10^{-4}$ to $5 \times 10^{-1}$ moles of inhibitor per liter of process stream.

10. The method of claim 1 wherein said process stream containing acidic corrosive agents has a pH in the range of from 1 to 5 and the concentration of chlorinated aromatic inhibitor is in the range of about $10^{-5}$ to $2 \times 10^{-1}$ moles of inhibitor per liter of process stream.

11. In a petroleum processing system comprising metal processing vessels containing process streams containing acid agents corrosive to said metal vessels, said process streams having an interface with said metal vessels, the improvement wherein a thin film of a chlorinated aromatic compound is provided on the surface of said metal vessel in contact with said process stream whereby chemical or electrochemical interaction between the acidic agent in said process stream and the metal surface is inhibited.

12. The system of claim 11 wherein said acidic corrosion agent comprises an aqueous solution of hydrochloric acid and said chlorinated aromatic compound comprises a chlorinated benzene.

References Cited

UNITED STATES PATENTS

| | | | |
|---|---|---|---|
| 2,586,323 | 2/1952 | Glassmire et al. | 208—47 |
| 2,908,640 | 10/1959 | Dougherty | 208—47 X |
| 2,911,351 | 11/1959 | Hill | 208—47 |

DELBERT E. GANTZ, Primary Examiner

G. E. SCHMITKONS, Assistant Examiner

U.S. Cl. X.R.

208—134; 252—146, 397